(12) United States Patent
Lundberg et al.

(10) Patent No.: US 8,307,214 B2
(45) Date of Patent: Nov. 6, 2012

(54) METHOD FOR RESTRICTING ACCESS TO MEDIA DATA GENERATED BY A CAMERA

(75) Inventors: Stefan Lundberg, Lund (SE); Christian Gehrmann, Lund (SE); Joacim Tullberg, Lund (SE); Fredrik Ternerot, Lund (SE)

(73) Assignee: Axis AB, Lund (SE)

( * ) Notice: Subject to any disclaimer, the term of this patent is extended or adjusted under 35 U.S.C. 154(b) by 392 days.

(21) Appl. No.: 12/821,746

(22) Filed: Jun. 23, 2010

(65) Prior Publication Data

US 2011/0016319 A1 Jan. 20, 2011

Related U.S. Application Data

(60) Provisional application No. 61/223,248, filed on Jul. 6, 2009.

(30) Foreign Application Priority Data

Jun. 30, 2009 (EP) .................................... 09164110

(51) Int. Cl.
*H04L 29/06* (2006.01)
(52) U.S. Cl. ................................ 713/182; 726/2; 726/4
(58) Field of Classification Search .................. 713/182; 726/2, 4
See application file for complete search history.

(56) References Cited

U.S. PATENT DOCUMENTS

| 6,292,900 | B1* | 9/2001 | Ngo et al. .......................... 726/6 |
| 6,859,671 | B1* | 2/2005 | Brown ............................. 700/56 |
| 7,178,035 | B1 | 2/2007 | Glen |
| 7,508,941 | B1 | 3/2009 | O'Toole, Jr. et al. |
| 2006/0047455 | A1* | 3/2006 | Catelani et al. .................. 702/85 |

FOREIGN PATENT DOCUMENTS

WO 0128251 A1 4/2001

* cited by examiner

*Primary Examiner* — Farid Homayounmehr
*Assistant Examiner* — Lisa Lewis
(74) *Attorney, Agent, or Firm* — Volpe and Koenig, P.C.

(57) ABSTRACT

A method for restricting access to media data generated by a camera comprising: setting a non-public initial user key, KICU, in the camera, providing a user client with the initial user key, KICU, establishing an authenticated relation between the user client and the camera by sending an authentication message including information based on the initial user key, KICU, from the user client to the camera, checking if an operational user key ($K_{OCU}$) is set in the camera, and performing, in response to the act of checking if the operational user key ($K_{OCU}$) is set in the camera, the acts a)-d) only if the operational user key ($K_{OCU}$) is not set: a) acquiring an operational user key ($K_{OCU}$), b) setting the operational user key ($K_{OCU}$) in the camera, c) sending the operational user key ($K_{OCU}$) to the user client, and d) indicating in the camera that the operational user key ($K_{OCU}$) is set.

17 Claims, 3 Drawing Sheets

METHOD FOR RESTRICTING ACCESS TO MEDIA DATA GENERATED BY A CAMERA

CROSS REFERENCE TO RELATED APPLICATIONS

This application claims the benefit of U.S. provisional application No. 61/223,248 filed on Jul. 6, 2009 and EPC application no. 09164110.0 filed on Jun. 30, 2009, which are incorporated by reference as if fully set forth.

TECHNICAL FIELD OF THE INVENTION

The present invention relates to a method for restricting access to media data generated by a camera and a camera arranged to encode the generated media data.

BACKGROUND OF THE INVENTION

An important part of a video surveillance system is the possibility to record video and other media content such as audio or alarm events. These recordings allow the user at a later time to e.g. search for particular media data and to track incidents etc.

Another important part of a video surveillance system is the possibility to monitor in real-time the area covered by the surveillance system.

In a subscriber based surveillance system the user would like a service provider to handle the set-up of the surveillance system as well as the media storage and storage services such that the user does not need to configure the surveillance system or any recordings of surveillance data himself. For example, the user should be able to directly connect to the service provider and search and view recordings of the surveillance data using search and retrieval services offered by the service provider.

However, real-time or recorded media data in a home environment might contain very sensitive information that the user would not, under any circumstances, like the service provider to have access to.

Hence, it is important to provide a system such that real-time or stored media data at the service provider site is protected and that the media data only can be accessed by the property owner. Furthermore, it must still be possible for the service provider to access recordings of meta data such as time stamps, video trigging information, alarm data or the like, such that the service provider can provide an efficient searching service for alarms and recordings to the end user.

A system for providing protected storage of data acquired by a data acquisition device is described in U.S. Pat. No. 7,477,740 by C. H. Bennet. In U.S. Pat. No. 7,477,740 a data acquisition device, e.g. a video camera with a microphone, connected to a secure encryption processor, is described. The secure encryption processor encrypts data acquired by the data acquisition device before it is transferred to the storage unit. This implies that the data is always stored in encrypted form. Thus, only an authorized person with the correct right access key will be able to decrypt the data.

However, if the data is encrypted according to U.S. Pat. No. 7,477,740 and only being accessible by the user it will be impossible for the service provider to access recordings of meta data such as time stamps, video trigging information, alarm data or the like, such that the service provider can provide an efficient searching service for alarms and recordings to the end user.

This invention describes a solution to the problems mentioned above.

SUMMARY OF THE INVENTION

One object of the present invention is to protect real-time or stored media data at the service provider site from unauthorized access by a person not entrusted by the owner/occupant of the monitored site.

The above object is achieved by the method and the camera according to the independent claims. Further embodiments of the invention are presented in the dependent claims.

In particular a method for restricting access to media data generated by a camera comprises setting a non-public initial user key in the camera, providing a user client with the initial user key, establishing an authenticated relation between the user client and the camera by sending an authentication message including information based on the initial user key from the user client to the camera, checking if an operational user key is set in the camera, and performing, in response to the act of checking if the operational user key is set in the camera, the acts a)-d) only if the operational user key is not set: a) acquiring an operational user key, b) setting the operational user key in the camera, c) setting the operational user key in the user client, and d) indicating in the camera that the operational user key is set. The method further comprises setting, in the camera (10), a media data encryption/decryption key associated with the operational user key, encrypting media data registered by the camera using the media data encryption/decryption key, and sending the encrypted media data to a service provider management server.

By means of this method for restricting access to media data generated by a camera it is possible to protect real-time or stored media data at the service provider site so that the media data only can be accessed by the user and not by the service provider. The media data registered by the camera and subsequently sent to the service provider management server is protected from being accessed by the service provider by encryption using the media data encryption/decryption key associated with the operational user key. The media data encryption/decryption key may be associated with the operational user key in different ways. According to an embodiment of the present invention the derivation of the media data encryption/decryption key is based on the operational user key. According to another embodiment of the present invention the media data encryption/decryption key may be securely distributed to the camera and the user client using the shared operational user key. Alternatively, according to yet another embodiment of the present invention the operational user key itself, which is already securely set in the camera and the user client, may be used as the media data encryption/decryption key. Thus, in order to get access to media data registered by the camera the media data encryption/decryption key associated with the operational user key must be known. According to the present invention it is ensured that it is only the user that has knowledge about the operational user key and thus has knowledge of the media data encryption/decryption key. This because the user needs to authenticate him/her selves using the initial user key before getting access to the camera at the first place and it is only an authenticated user that will be able to trigger the acquiring of the operational user key and the operational user key is only acquired if an operational user key is not already set in the camera. This is achieved by checking if the operational user key is already set in the camera before acquiring the operational user key. For example, if the service provider, prior to providing the initial user key to the user, registers him/herself as a user using the initial user key, this will be detected by the user as he/she will fail to successfully register by the camera and get control over it. Hence, this method prevents e.g. the service provider to get control of the camera even if the initial user key is provided to the user by the service provider. Thereby, the procedure makes sure that if the service provider chooses to register at the camera on behalf of user in order to get access to the operational user key the user will discover it when he tries to repeat the procedure. Because the acquiring of the operational key will fail and the user will thereby discover that someone already has acquired the operational user key.

According to an embodiment the method may further comprise retrieving media data via the service provider management server by means of an arbitrary user client and decrypting the retrieved media data using the media encryption/decryption key.

According to another embodiment the method may further comprise acquiring a common key to be shared between the camera, the user client and a service provider management server, setting the common key in the camera, providing the common key to the user client and to the service provider management server, encrypting meta data registered by the camera using a meta data encryption/decryption key associated with the common key, and sending the encrypted meta data to the service provider management server. The meta data encryption/decryption key may be associated with the common key in different ways. According to an embodiment of the present invention derivation of the meta data encryption/decryption key is based on the common key. According to another embodiment of the present invention the meta data encryption/decryption key may be securely distributed to the camera, the service provider management server and the user client using the shared common key. Alternatively, according to yet another embodiment of the present invention the common key itself, which is already securely set in the camera, the service provider management server and the user client, may be used as the media data encryption/decryption key. This will assure that the meta data is protected from being accessed by a third part. Further by sending the meta data to the service provider management server it will be possible for the service provider to access recordings of meta data such as time stamps, video trigging information, alarm data or the like, such that the service provider can provide an efficient searching service for alarms and recordings to the user.

According to yet another embodiment the method may further comprise acquiring a service provider key, and providing the service provider key to the service provider management server, wherein the service provider key is used to guarantee that only the service provider management server can access service provider configuration functions.

According to an embodiment the act of indicating in the camera that the operational user key is set may comprise deleting the initial user key from further usage.

According to another embodiment the method may further comprising indicating that the operational user key is already set if the operational user key is set.

According to yet another embodiment the method may further comprise setting a master key in the camera. The act of setting the non-public initial user key in the camera may in such case comprise; acquiring the non-public initial user key by deriving the non-public initial user key from the master key using a first one-way function.

According to an embodiment the method the step of acquiring the service provider key may comprise; deriving the service provider key from the master key using a second one-way function.

According to another embodiment the step of acquiring the common key may comprise deriving the common key from the non-public initial user key using a third one-way function, or deriving the common key from the service provider key using a fourth one-way function, wherein the third one-way function and the fourth one-way function are arranged to produce an identical common key independent of if the common key is derived from the non-public initial user key or from the service provider key.

According to yet another embodiment the act of establishing the authenticated relation between the user client and the camera may further comprise authenticating the camera by sending a video sequences from the camera to the user client for verification of that the video sequence is captured in real time by the intended camera, and sending from the user client to the camera a confirmation message as confirmation of authentication of the camera, after authenticating the user client by sending an authentication message including information based on the initial user key from the user client to the camera is performed.

Further, according to another aspect of the invention a network camera arranged to encode media data registered by the camera comprises a key generating means arranged to generate an initial user key or an operational user key, using a secure key generation process, an indication means arranged to indicate if the operational user key has been generated, a checking means arranged to check if the indication means has indicated that the operational user key has been generated, an encrypting means arranged to encrypt media data registered by the camera using a media data encryption key associated with the operational user key, and a digital network module arranged to transmit the encrypted media data. The media data encryption/decryption key may be associated with the operational user key in different ways. According to one embodiment of the present invention the derivation of the media data encryption/decryption key is based on the operational user key. According to another embodiment of the present invention the media data encryption/decryption key may be securely distributed to the camera and the user client using the shared operational user key. Alternatively, according to yet another embodiment of the present invention the operational user key itself, which is already securely set in the camera and the user client, may be used as the media data encryption/decryption key.

According to an embodiment the network camera may further comprise a resetting means arranged to reset the generated operational user key.

According to another embodiment the resetting means may comprise a reset button.

According to yet another embodiment the indicating means may be arranged to delete the initial user key from further usage if the operational user key has been generated.

According to an embodiment the key generating means may further be arranged to generate a common key, wherein the encrypting means may further be arranged to encrypt meta data registered by the camera using a meta data encryption/decryption key associated with the common key, and wherein the digital network module may further be arranged to transmit the encrypted meta data. The meta data encryption/decryption key may be associated with the common key in different ways. According to one embodiment of the present invention derivation of the meta data encryption/decryption key is based on the common key. According to another embodiment of the present invention the meta data encryption/decryption key may be securely distributed to the camera, the service provider management server and the user client using the shared common key. Alternatively, according to yet another embodiment of the present invention the common key itself, which is already securely set in the camera, the service provider management server and the user client, may be used as the media data encryption/decryption key.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in more detail by way of examples with reference to the appended schematic drawings, which shows embodiments of the invention.

DETAILED DESCRIPTION OF PREFERRED EMBODIMENTS

Figure 1:
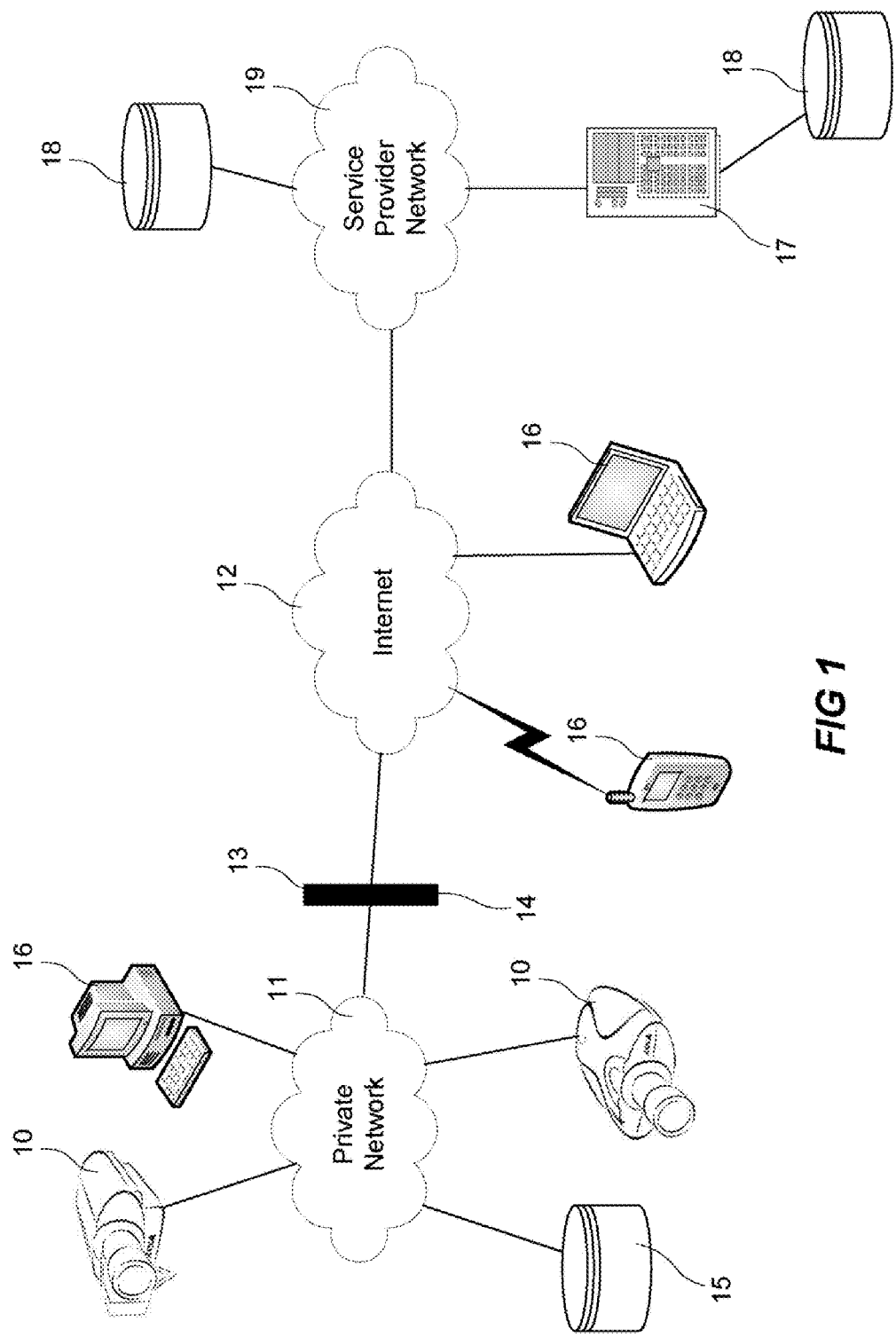
FIG. 1 is a schematic diagram of one embodiment of a surveillance system according to the present invention.

Video surveillance may be implemented as a subscriber based system wherein a user installs network video cameras at a location to be monitored, e.g. the users home, but where the cameras are controlled and managed by a service provider or at least via a service provider, as illustrated in FIG. 1.

The surveillance system according to the embodiment shown in FIG. 1 comprises a network video camera 10 monitoring a property. The network video camera 10 is connected to a private network 11, which is connected to a public network such as the Internet 12, a NAT 13 and/or a firewall 14 protecting the private network 11 from external attacks, a user client 16 either directly connected to the private network 11 or connected to the Internet 12, a service provider offering the user property surveillance services through a public service provider management server 17 connected to a service provider network 19, and a service provider storage unit 18 either directly connected to the service provider management server 17 or connected to the service provider network 19. The service provider network 19 is also connected to the public network such as the Internet 12.

The network video camera 10 monitors the local property of the user and at the same time records media data (e.g. video data and possibly other media data such as audio data) on the remote service provider storage unit 18. Furthermore, in addition to the media data the network video camera 10 also records meta data such as time stamps, video trigging information, alarm data or the like. Also the meta data is recorded on the remote service provider storage unit 18. Optionally the media data and the meta data may also be recorded on a local storage unit 15.

If the user would like to search for and retrieve stored media data by means of the user client 16, the user connects over the Internet 12 to the service provider management server 17. When connected to the service provider management server 17 the user may search and download recorded media data. The media data may be downloaded by downloading an URL or by retrieving a media stream from the service provider management server 17. Optionally, if the media data and the meta data is located on the local storage unit 15 the user client 16 may access the recorded media data directly on the local storage unit 15.

Similar, if the user would like to access real-time media data the user connects to the service provider management server 17 using the user client 16 and requests real time media data to be downloaded or streamed to the user client 16. Optionally, if the user client 16 is connected to the private network 11 the user may directly access the network video camera 10 for accessing the real time media data.

The advantage of including the service provider in the system, as compared to a system where the user completely configure and manage the surveillance system on his/her own, is that the latter would require advanced configuration skills from the user. In addition, such configuration would require additional software and equipment. Furthermore, the user would not be able to easily access the network video camera 10 or the local storage unit 15 from the Internet 12, as they are located behind a firewall 14 and/or a NAT 13. On the other hand a system with a service provider requires that the user puts lots of trust into the service provider as the service provider will have access to real time media data or recorded media data from the property of the user. The present invention addresses this issue.

Figure 2:
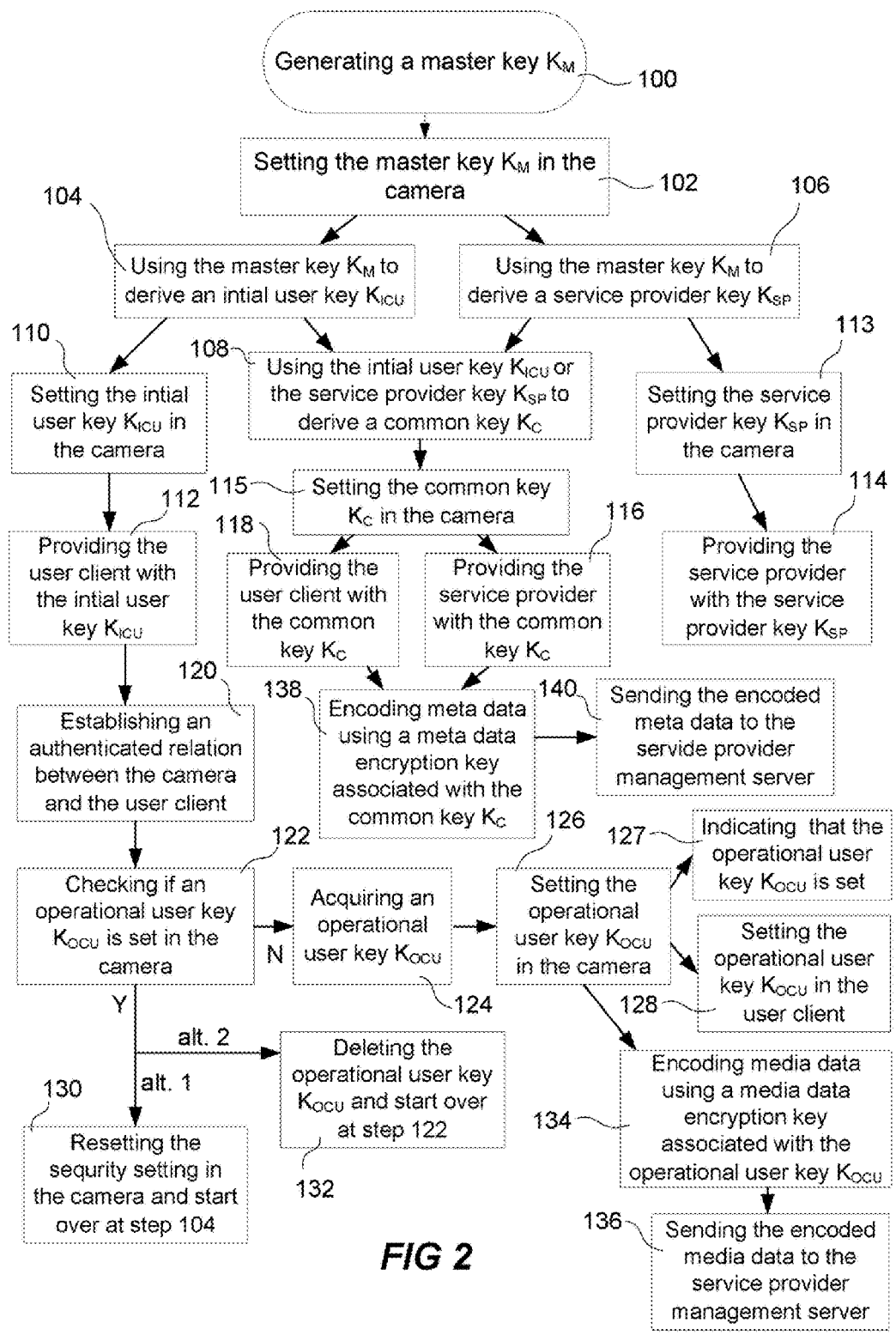
FIG. 2 is a schematic flowchart of the process generating security association keys and encryptions keys as well as encrypting media data and meta data registered by a camera.

In accordance with the present invention a media protection solution based on key derivation in several steps is presented. According to one embodiment the key derivation in several steps is performed as followed, see FIG. 2.

As a first step a unique secret master key $K_M$ is generated, step 100. The secret master key $K_M$ is set in the camera 10, step 102. This setting of the master key $K_M$ may e.g. be performed by storing the master key $K_M$ in the video camera 10. The storing of the master key $K_M$ may e.g. be performed by a camera manufacturer or by the service provider. The master key $K_M$ is generated, using a secure key generation process, such as for example key generation using secure random sources based on measurement of thermal or radio noise in combination with a secure pseudo random number generator. The master key $K_M$ may either be generated within the camera 10 itself or the master key $K_M$ may be generated externally and thereafter be provided to the camera 10.

The master key $K_M$ is used to derive an initial user key $K_{ICU}$, step 104. The initial user key $K_{ICU}$ may be camera unique. The master key $K_M$ is also used to derive a service provider key $K_{SP}$, step 106. The service provider key $K_{SP}$ may be camera unique. The initial user key $K_{ICU}$ or the service provider key $K_{SP}$, may in turn be used to derive a common key $K_C$, step 108. Also the common key $K_C$ may be camera unique.

The derivation of the initial user key $K_{ICU}$ from the master key $K_M$ may be performed by means of a first one-way function $f_1$, i.e. $K_{ICU}=f_1(K_M)$.

A suitable one-way function is a function that is easy to compute on every input, but hard to invert given the image of a random input. Example of such functions are hash functions such a SHA-1 or SHA-256 or functions derived from such hash functions such as SHA-1 based HMAC on fixed (known) text input (with the key value as unknown input) or SHA-256 based HMAC and the like.

Similarly, the derivation of the service provider key $K_{SP}$ from the master key ($K_M$) may be performed by means of a second one-way function $f_2$, i.e. $K_{SP}=f_2(K_M)$.

The common key $K_C$ may be derived from the initial user key $K_{ICU}$ by means of a third one-way function $f_3$, i.e. $K_C=f_3(K_{ICU})$. Alternatively, the common key $K_C$ may be derived from the service provider key $K_{SP}$ by means of a fourth one-way function $f_4$, i.e. $K_C=f_4(K_{SP})$.

The third one-way function ($f_3$) and the fourth one-way function ($f_4$) are arranged to produce an identical common key $K_C$ independent of if the common key $K_C$ is derived from the non-public initial user key $K_{ICU}$ or from the service provider key $K_{SP}$, i.e. $K_C = f_3(K_{ICU}) = f_4(K_{SP})$. An example of such construction is when $K_{ICU}$ and $K_{SP}$ are derived such that they have a common identical part and that the one-way function $f_3$ truncates $K_{ICU}$ to this common part and applies a suitable hash function on that truncated part. Similarly $f_4$ then first truncates $K_{SP}$ to the common part and then applies the same hash function to this part. In this case $f_1$ and $f_2$ needs to be chosen to match this requirement. $f_1$ and $f_2$ can indeed be chosen in such a way by for example defining $f_1$ (K) as $a_{(K)} + f'_{1(K)}$ and $f_2(K)$ as $a_{(K)} + f'_{2(K)}$, where + denotes concatenation and $f'_1$ and $f'_2$ all denotes unique one-way hash functions).

All these keys, the master key $K_M$, the initial user key $K_{ICU}$, the service provider key $K_{SP}$ and the common key $K_C$, are used as the basis for initial security associations between trusted or semi-trusted entities but they are not necessarily the keys used for the actual protection of the media data.

The initial user key $K_{ICU}$ is set in the camera 10, step 110, and provided to the user client 16, step 112, together with the camera 10. Thus, the initial user key $K_{ICU}$ is physically located at the user client 16 and is under control of the user. The camera 10 and the initial user key $K_{ICU}$ may e.g. be provided to the user by the service provider.

The service provider key $K_{SP}$ is set in the camera 10, step 113, and provided to the service provider, step 114.

The common key $K_C$ is set in the camera 10, step 115, and provided both to the user and to the service provider, step 116 and 118. This may e.g. be performed using the relationship between the common key $K_C$, the initial user key $K_{ICU}$ and the service provider key $K_{SP}$ described above, i.e. $K_C = f_3(K_{ICU}) = f_4(K_{SP})$.

By setting the master key in the camera and subsequently deriving the initial user key, the service provider key and the common key from the master key a solution for efficiently distributing keys for access to media data, meta data and cameras is provided.

Before getting access to the camera 10 the user needs to authenticate himself, at the camera 10, as being the user. During the authentication an authenticated relation between the user client 16 and the camera 10 is established, step 120. The user is authenticated by sending an authentication message including information based on the initial user key $K_{ICU}$ and a user identity from the user client 16 to the camera 10. The camera is authenticated by sending a video sequences from the camera 10 to the user client 16 for verification of that the video sequence is captured in real time by the intended camera 10, and sending from the user client 16 to the camera 10 a confirmation message as confirmation of authentication of the camera.

When the authenticated relation between the camera 10 and the user client 16 has been established an operational user key $K_{OCU}$ is acquired, step 124, set in the camera, step 126, and distributed to the user, step 128. The setting of the operational user key $K_{OCU}$ is also indicated in the camera 10, step 127. It is only the owner of the operational user key $K_{OCU}$ that will have full access rights to the camera 10 and to the media data produced by the camera 10. The operational user key $K_{OCU}$ may e.g. be generated in the camera 10. The distribution of the operational user key $K_{OCU}$ may be protected by the initial user key $K_{ICU}$. The operational user key $K_{OCU}$ may be camera unique.

Before step 124 acquiring the operational user key $K_{OCU}$ is performed a check is done checking if the operational user key $K_{OCU}$ is set in the camera or not, step 122. Step 124, acquiring the operational user key $K_{OCU}$, step 126 setting the operational user key $K_{OCU}$ in the camera 10, step 127 indicating in the camera 10 that the operational user key $K_{OCU}$ is set, and step 128, sending the operational user key $K_{OCU}$ to the user client 16, is only performed if the result from the check in step 122 indicates that the operational user key $K_{OCU}$ is not set in the camera 10. Thus, the initial user key $K_{ICU}$ will only be used once to produce the operational user key $K_{OCU}$. Accordingly, if the service provider, prior to providing the initial user key $K_{ICU}$ to the user, authenticates him/herself as a user using the initial user key $K_{ICU}$, this will be detected by the user as he/she will fail to be successfully authenticated by the camera 10 and get control over it.

Hence, this method prevents e.g. the service provider to get control of the camera even if the initial user key $K_{ICU}$ is provided to the user by the service provider. Thereby, the procedure makes sure that if the service provider chooses to register at the camera 10 on behalf of user in order to get access to the operational user key $K_{OCU}$ the user will discover it when he tries to repeat the procedure. Because the acquiring of the operational key $K_{OCU}$ will fail and the user will thereby discover that someone already has acquired the operational key $K_{OCU}$.

If any problems during the registration of the user with the camera 10 occurs, the user may generate a new initial user key $K_{ICU}$ or a new operational user key $K_{OCU}$. For example, a user with physical access to the camera 10 or according to other access restriction rules may be able to reset the security settings in the camera and trigger a generation of a new initial user key $K_{ICU}$ in the camera, step 130. Alternatively a user with physical access to the camera or according to other access restriction rules may be able to delete the currently used operational user key $K_{OCU}$ and require a new registration using the initial user key $K_{ICU}$ and thus acquiring a new operational user key $K_{OCU}$, step 132. The resetting process, step 130, or the deleting process, step 132, may be initiated by pressing a reset button located on the housing of the camera 10. Examples of other access restriction rules may e.g. be remote local control based on wireless or light transmission trigger signal provided by the user or remote control over the network based on a protected trigger. The trigger may in the latter case be protected by e.g. the common key $K_C$ or the service provider key $K_{SP}$.

The present invention enables all media data transmitted from the camera 10 to be protected based on the operational user key $K_{OCU}$ and enables the owner/occupant of the site monitored by the camera to have exclusive control of the media data generated by the camera 10.

According to an embodiment of the present invention the media data is encrypted by symmetrical encryption using a media data encryption/decryption key. This media data encryption/decryption key is according to one embodiment time segment keys. To increase security, the invention provides for a communication to be divided, into different time segments each of which may be encrypted using different time segment keys. The time segment key used may e.g. be changed based on time, amount of data being sent or the number of messages sent. E.g. may the time segment key be changed after x minutes, after y Megabyte of data, or after z number of messages being sent. In accordance with the present invention, the time segment keys used for respective time segments are not discarded but encrypted and stored in association with the encrypted information of each time segment for decryption and/or authentication, i.e. the present time segment key may be used to decrypt the data including an earlier time segment key enabling decryption of media data encrypted by means of this earlier time segment key. As is known in the art, symmetrical encryption techniques use the same key for both encryption and decryption. Symmetrical encryption and decryption is fast but requires the sender (in this case the camera 10) and receiver (in this case the user client 16) to share a key beforehand. According to the present invention the key shared beforehand may be the operational user key $K_{OCU}$. The media data itself is encrypted and decrypted using media data encryption/decryption keys in the form of a time segment keys.

According to an embodiment of the present invention the derivation of media data encryption/decryption keys in the form of time segment keys may be based on the operational user key $K_{OCU}$.

Further, according to another embodiment media data encryption/decryption keys in the form of time segment keys may be securely distributed to the sender (the camera 10) and the receiver (the user client 16) using the operational user key $K_{OCU}$ shared beforehand.

Alternatively, according an embodiment of the present invention the operational user key $K_{OCU}$ itself, which is already securely distributed to the camera 10 and the user client 16, may be used as media data encryption/decryption key.

Thus, the media data generated by the camera 10 is encrypted and decrypted using media data encrypting/decrypting keys associated with the operational user key $K_{OCU}$, step 134. Because the media data encrypting/decrypting key either is derived from the operational user key $K_{OCU}$, securely distributed protected by the operational user key $K_{OCU}$ or the media data encrypting/decrypting key indeed is the operational user key $K_{OCU}$ the owner/occupant of the site monitored by the camera is having exclusive control of the media data generated by the camera 10.

When being encrypted the media data is being sent to the service provider management server 17, step 136, for storing.

Because it is only the user that is in possession of the media data encryption/decryption key it is only the user that may decrypt and actually view the media data generated by the camera 10. In addition, all meta data may instead be protected based on the common key $K_C$.

According to an embodiment of the present invention also the meta data is encrypted by symmetrical encryption using a meta data encryption/decryption key. The meta data encryption/decryption key may be time segment keys, regarding the time segment keys see above. According to the present invention the key shared beforehand may be the common key $K_C$. The meta data itself is encrypted and decrypted using meta data encryption/decryption keys in the form of time segments keys.

According to an embodiment of the present invention the derivation of meta data encryption/decryption keys in the form of time segment keys may be based on the common key $K_C$.

Further, according to another embodiment meta data encryption/decryption keys in the form of time segment keys may be securely distributed to the sender (the camera 10) and the receiver (the service provider management server 17 and/or the user client 16) using the common key $K_C$ shared beforehand.

Alternatively, according an embodiment of the present invention the common key $K_C$ itself, which is already securely distributed to the camera 10, the service provider management server 17 and/or the user client 16, may be used as meta data encryption/decryption key.

Thus, meta data generated by the camera 10 is encrypted and decrypted using the meta data encrypting/decrypting key, step 138. Thus, meta data registered by the camera 10 may be encrypted and decrypted using the meta data encryption key associated with the common key $K_C$, step 138, and sent to the service provider management server 17, step 140. Accordingly, both the user and the service provider may access the meta data generated by the camera 10, this because both the user and the service provider are having access to the common key $K_C$.

Alternatively, the camera 10 may be configured in such way, to protect all data (both media and meta data) using the common key $K_C$ such that both the meta and the media data may be accessed both by the user and by the service provider. This is useful when the user would like the service provider to monitor the site of the camera. This may example be useful when the user is away for a long period.

Thus, the legitimate user may always, depending on configuration, access and decrypt media data with the help of the operational user key $K_{OCU}$ or the common key $K_C$.

Furthermore, the camera 10 may be configured for remote configuration. The interface for remote configuration is divided into at least two sub sets (potential partly overlapping): one set that can be accessed by the service provider and another set that can be accessed by the user. The service provider key $K_{SP}$ is used to guarantee that only the service provider can access the service provider configuration functions, e.g. service provider address network configurations, wireless settings, firmware upgrade etc. Similarly, the operational user key $K_{OCU}$ is used to guarantee that only the user can access the user configuration functions, e.g. the camera access protection mechanism is implemented such that only the holder of the operational user key $K_{OCU}$ will be able to set the encryption policy, i.e., if the media data shall be protected based on the operational user key $K_{OCU}$ or the common key $K_C$. Example of other functions that can only be available for the user are media streaming configurations (frame rate, resolution etc.) or Pan-Tilt-Zoom control.

To make the system easy to use the user may be equipped with a tool (security token/security device) to generate encryption and decryption key pairs and help with key storage. For example, in the case when the media data encryption/decryption key is based on the operational user key $K_{OCU}$ the operational user key $K_{OCU}$ may be stored inside a hardware security token and a key management scheme is used between the token and the camera such that media data encryption/decryption keys always are generated inside the token and the camera without exposing the operational user key $K_{OCU}$ outside the secure token.

The actual media protection (authentication, encryption etc.) can be performed using suitable state-of-the art media protection mechanisms such as for example the methods described in U.S. Pat. No. 7,477,740 by Bennett.

Next a more detailed description of the derivation of the different keys and the installation steps involved in installing video surveillance in a home environment being accomplished by a subscriber based system wherein a user installs a network video camera 10 in his home but where the camera 10 is controlled and managed by a service provider is given.

The camera 10 is manufactured by the camera manufacturer. The master key $K_M$ may be generated at the manufacturing of the camera 10, using a secure key generation process and thereafter being set in the camera 10. Setting the master key $K_M$ in the camera 10 may e.g. be done by storing the master key $K_M$ in the camera 10 using a secure process. One example of such a secure process is a so-called onboard key generation inside protected camera hardware. Another example is when the key is generated outside the camera using a secure key generation process and then transferred to a protected storage location inside the camera. In the latter case, the key will be securely destroyed in the external environment once successfully installed into the camera 10.

The master key $K_M$ is later used to generate the three different sub keys: the service provider key $K_{SP}$, the initial user key $K_{ICU}$ and the common key $K_C$. These sub keys are also set in the camera 10. The keys may e.g. be set in the camera 10 by securely storing them in the camera 10.

The initial user key $K_{ICU}$ may be derived from the master key $K_M$ using a suitable first one-way function $f_1$, i.e. $K_{ICU}=f_1(K_M)$, such that given the initial user key $K_{ICU}$ it will be computational infeasible to derive the master key $K_M$. Similarly, the service provider key $K_{SP}$ is derived from the master key $K_M$ using a suitable second one-way function $f_2$, i.e. $K_{SP}=f_2(K_M)$, such that given the service provider key $K_{SP}$ it will be computational infeasible to derive the master key $K_M$. Furthermore, said suitable first and second one-way functions $f_1$, $f_2$ are constructed such that by using additional third and forth one-way functions $f_3$, $f_4$, the common key $K_C$ may be derived according to the following: $K_C=f_3(K_{ICU})=f_4(K_{SP})$. Thus, the common key $K_C$ may be derived from the initial user key $K_{ICU}$ by means of a third one-way function $f_3$, i.e. $K_C=f_3(K_{ICU})$ or alternatively, the common key $K_C$ may be derived from the service provider key $K_{SP}$ by means of a fourth one-way function $f_4$, i.e. $K_C=f_4(K_{SP})$. The third one-way function ($f_3$) and the fourth one-way function ($f_4$) are arranged to produce an identical common key $K_C$ independent of if the common key $K_C$ is derived from the non-public initial user key $K_{ICU}$ or from the service provider key $K_{SP}$, i.e. $K_C=f_3(K_{ICU})=f_4(K_{SP})$.

The service provider key $K_{SP}$ is provided to the service provider. The camera 10 may possibly be delivered to the service provider before it is delivered to the user. In this case, it is possible that the service provider key $K_{SP}$ is delivered together with the camera 10. Alternatively, the service provider key $K_{SP}$ may be provided to the service provider when the camera 10 connects to the service provider server 17. Once the service provider key $K_{SP}$ is delivered or provided to the service provider the service provider uses the function $f_4$ and calculates the common key $K_C$, $K_C=f_4(K_{SP})$, and stores the service provider key $K_{SP}$ and the common key KC securely in a suitable database. User data, e.g. name, address etc., is stored in the database, associated with the service provider key $K_{SP}$ and the common key $K_C$. The service provider key $K_{SP}$ may also be used to guarantee that only the service provider management server 17 can access service provider configurations functions, e.g. service provider address and the like.

The camera 10 is delivered to the user and installed into the user residential network 11. The user receives together with the camera 10 the camera unique initial user key $K_{ICU}$ (possibly via the service provider or by other means). The camera 10 is installed into the residential network 11 such that it is accessible by the service provider from arbitrary location with Internet 12 access and by the user client 16 from arbitrary location with Internet 12 access.

The initial user key $K_{ICU}$ is provided to the user client 16. For example may the user securely install the initial user key $K_{ICU}$ into the user client 16. The installation of the initial user key $K_{ICU}$ may be performed via a USB stick or the like. Next, the third one-way function $f_3$ is used to calculate the common key $K_C$, i.e. $K_C=f_3(K_{ICU})$, which is also securely stored into the user client 16.

The user connects to the camera 10, potentially via the service provider system, and requests registration of the user client 16 by the camera 10.

The user client 16 may e.g. connect to a proxy server in the service provider network that will allow a secure data transmission tunnel to be established between the user client 16 and the camera 10.

The transmission using the data transmission tunnel may be protected for achieving confidentiality and integrity. This may be achieved through protocols such as TLS, SSH or IKE/IPsec. At the time for establishing the tunnel, the camera 10 is authenticated using a public key certificate. The public key certificate should be signed by a trusted third certificate authority party and the signature of this authority shall be verified by the client prior to accepting the secure tunnel establishment all according to the chosen protocol (TLS, SSH or IKE/IPsec) used.

Next a mutual authentication is performed between the user client 16 and the camera 10. The user client 16 is authenticated by sending an authentication message including information based on the initial user key $K_{ICU}$ from the user client 16 to the camera 10. Whereas the camera 10 is authenticated by sending a video sequences from the camera 10 to the user client 16 for verification of that the video sequence is captured in real time by the intended camera 10, and sending from the user client 16 to the camera 10 a confirmation message as confirmation of authentication of the camera 10. If the mutual authentication fails, the camera 10 and/or the user client 16 abort the authentication process.

Next a more detailed description of the authentication of the camera 10 is given. Once the secure tunnel is established, the camera 10 sends, to the user client 16, one or several video sequences, for example a sequence of JPEG images, recorded by the camera 10. These video sequences are signed with the same public key used at the camera authentication at the tunnel establishment.

The user client 16 receives the signed one or several video sequences from the camera 10 and verifies that they are signed by the same public key that was used for the secure tunnel establishment. The user is then asked by a registration software user interface to verify that the one or several video sequences are indeed taken in real time by the camera 10. If the user confirms this, the user client 16 sends, protected by the secure tunnel, a confirmation message as confirmation of authentication of the camera 10.

When the authenticated relation between the camera 10 and the user client 16 has been established an operational user key $K_{OCU}$ is acquired set in the camera and distributed to the user. The setting of the operational user key $K_{OCU}$ is also indicated in the camera 10. It is only the owner of the operational user key $K_{OCU}$ that will have full access rights to the media data produced by the camera 10. The operational user key $K_{OCU}$ may be acquired by generating it in the camera 10. The distribution of the operational user key $K_{OCU}$ may be protected by the initial user key $K_{ICU}$. The operational user key $K_{OCU}$ may be camera unique.

When the mutual authentication is performed the operational user key $K_{OCU}$ is acquired, e.g. by secure generation in the camera 10. Before acquiring the operational user key $K_{OCU}$ a check is performed checking whether the operational user key $K_{OCU}$ is already set in the camera 10 or not. The operational user key $K_{OCU}$ is only acquired if the operational user key $K_{OCU}$ is not set in the camera 10. After acquiring the operational user key $K_{OCU}$ the operational user key $K_{OCU}$ is set in the camera 10 and sent, protected by the secure tunnel, to the user client 16. Thus, the initial user key $K_{ICU}$ will only be used once to produce the operational user key $K_{OCU}$. This prevents e.g. the service provider to get control of the media data even if the initial user key $K_{ICU}$ is provided to the user by the service provider. For example, if the service provider, prior to providing the initial user key $K_{ICU}$ to the user, registers him/herself as a user using the initial user key $K_{ICU}$, this will be detected by the user as he/she will fail to successfully register by the camera 10 and get control over it. The operational user key $K_{OCU}$ is securely stored in the camera 10 and in the user client 16.

Next, the camera 10 deactivates the initial user key $K_{ICU}$ from further usage. Thus, the camera 10 will not accept this initial user key $K_{ICU}$ as basis for any new operational user key $K_{OCU}$ establishment. This may e.g. be performed by indicating in the camera that the initial user key $K_{ICU}$ is used, by indicating in the camera that the operational user key $K_{OCU}$ is set or by deleting the initial user key $K_{ICU}$.

The procedure described above makes sure that if the service provider chooses to register at the camera 10 on behalf of user in order to get access to the operational user key $K_{OCU}$ the user will be notified. Once the true user tries to repeat the procedure, it will fail and the user will detect the impersonation made by the service provider.

According to a second embodiment of the present invention the operational user key $K_{OCU}$ may be shared between the user client 16 and multiple cameras 10. This can be achieved in several different ways.

According to one alternative, the operational user key $K_{OCU}$ is generated in the user client 16 and thereafter securely transferred to the camera 10 instead of being generated in the camera 10. Hence, the user client 16 may transfer the very same operational user key $K_{OCU}$ to several different cameras 10.

According to a second alternative, the operational user key $K_{OCU}$ is still generated in the camera 10. However the generation of the operational user key $K_{OCU}$ is based on a common secret key shared between all cameras together with a camera unique identifier, e.g. a camera serial number, identifying each camera that the user would like to control in his/her system. During the step of generating the operational user key $K_{OCU}$ in each camera 10 the user provides the camera 10 with the camera unique identifier identifying each camera that the user would like to control in his/her system and consequently make sure that the same unique secret key will be generated in all cameras. If the user client does not provide the camera with the camera unique identifier during the generation process the camera will refuse the registration.

According to a third alternative, a combination of alternative one and two are used.

Figure 3:
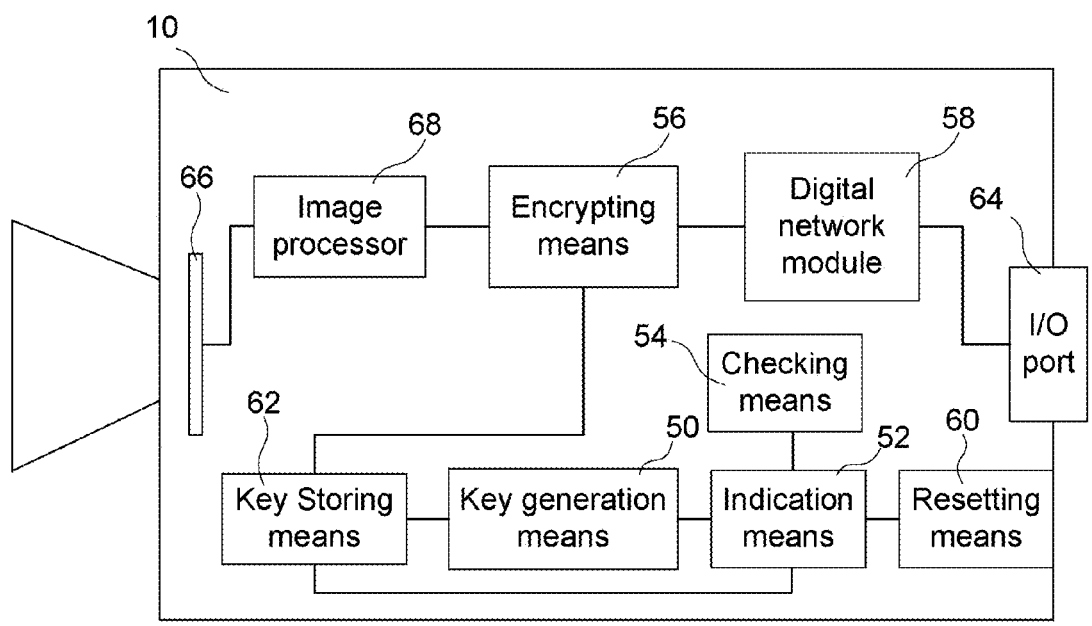
FIG. 3 is a schematic drawing of a camera according to one embodiment of the present invention.

FIG. 3 illustrates a network enabled digital video camera 10 according to an embodiment of the present invention. The network enabled digital video camera is arranged to be connected to a digital network. The digital network may e.g. be part of a surveillance system managed by a service provider. The network camera 10 comprises a key generating means 50, an indication means 52, a checking means 54, an encrypting means 56, a digital network module 58, a resetting means 60, a key storing means 62, an input/output (I/O) port 64, an image sensor 66 and an image processor 68.

Generation of media data, e.g. digital video images, in the network enabled digital video camera 10 and providing the media data to the I/O port 64 can be described as below. The image sensor 66, e.g. a CCD or a CMOS, captures digital images. The captured digital images are forwarded to the image processor 58, wherein the digital video images are rendered. The rendered digital video images may be forwarded to the compression unit (not shown), wherein the digital video images are compressed according to a predefined standard, such as H.264, JPEG, M-JPEG or MPEG. Thereafter the (possibly compressed) digital video or image signal is encrypted by the encrypting means 56 before being forwarded to the digital network module 58 arranged to transmit and receive digital signals, wherein the encrypted digital video or image signal (i.e. encrypted media data) is processed and prepared for transmission through a digital network via the I/O port 64.

It should be noted that the network enabled digital video camera also may be adapted to record audio data. The audio data may also be encrypted by the encrypting means 56 before being transmitted via the digital network module 58.

The media data (i.e. audio data and video or image data) is encrypted by the encrypting means 56 by means of the media encryption/decryption key associated with the operational user key $K_{OCU}$. According to what is described above, By encrypting the media data by means of the media encryption/decryption key associated with the operational user key $K_{OCU}$ only the user may have access to the media data, this because the service provider does not have knowledge of the operational user key $K_{OCU}$. Also according to the above, alternatively, the media data (i.e. audio data and video or image data) may be protected using the common key $K_C$. By protecting the media data using the common key $K_C$ both the user and the service provider have access to the media data, this because both the user and the service provider have knowledge of the common key $K_C$.

Moreover, meta data (such as time stamps, video trigging information, alarm data or the like) registered or generated by the camera 10 may be encrypted by the encryption means 56. Accordingly, the digital network module 58 is arranged to transmit encrypted meta data. According to what is described above, the meta data may e.g. be encrypted by means of the meta data encryption/decryption key associated with the common key $K_C$. By encrypting the meta data by means of the meta data encryption/decryption key both the user and the service provider have access to the meta data, this because both the user and the service provider have knowledge of the common key $K_C$. Thus, the service provider get access to the meta data and are thus e.g. able to provide an efficient searching service for alarms and recordings to the user.

The operational user key $K_{OCU}$ and the common key $K_C$ are generated by the key generating means 50. The key generating means 50 may further be arranged to generate the initial user key $K_{ICU}$ and/or the service provider key $K_{SP}$. The initial user key $K_{ICU}$, the operational user key $K_{OCU}$, the common key $K_C$ and the service provider key $K_{SP}$ are generated using a secure key generation process. A secure key generation process is performed in a protected execution environment (hardware and/or software) that prevents secret information to be leaked to unsecure software executing on the same platform or through direct physical tampering of the device.

The generated keys are stored in the key storing means 62. Also the master key $K_M$, e.g. generated by the camera 10 manufacturer (see above), is stored in the key storing means 62.

According to above, the initial user key $K_{ICU}$ may be derived from the master key $K_M$, using a suitable first one-way function $f_1$, i.e. $K_{ICU}=f_1(K_M)$, such that given the initial user key $K_{ICU}$ it will be computational infeasible to derive the master key $K_M$. Similarly, the service provider key $K_{SP}$ is derived from the master key $K_M$, using a suitable second one-way function $f_2$, i.e. $K_{SP}=f_2(K_M)$, such that given the service provider key $K_{SP}$ it will be computational infeasible to derive the master key $K_M$. Furthermore, said suitable first and second one-way functions $f_1$, $f_2$ are constructed such that for additional third and forth one-way functions $f_3$, $f_4$, the common key $K_C$ may be derived according to the following: $K_C=f_3(K_{ICU})=f_4(K_{SP})$. Thus, the common key $K_C$ may be derived from the initial user key $K_{ICU}$ by means of a third one-way function $f_3$, i.e. $K_C=f_3(K_{ICU})$ or alternatively, the common key $K_C$ may be derived from the service provider key $K_{SP}$ by means of a fourth one-way function $f_4$, i.e. $K_C=f_4(K_{SP})$. The third one-way function ($f_3$) and the fourth one-way function ($f_4$) are arranged to produce an identical common key $K_C$ independent of if the common key $K_C$ is derived from the non-public initial user key $K_{ICU}$ or from the service provider key $K_{SP}$, i.e. $K_C=f_3(K_{ICU})=f_4(K_{SP})$.

Further, according to above the service provider (in the form of the service provider management server 17) is provided with the service provider key $K_{SP}$ and the user (e.g. in the form of the user client 16) is provided with the initial user key $K_{ICU}$.

Before getting access to the camera 10 the user needs to authenticate himself, at the camera 10, as being the user. During the authentication an authenticated relation between the user client 16 and the camera 10 is established. The user is authenticated by sending an authentication message including information based on the initial user key $K_{ICU}$ from the user client 16 to the camera 10. The camera is authenticated by sending a video sequences from the camera 10 to the user client 16 for verification of that the video sequence is captured in real time by the intended camera 10, and sending from the user client 16 to the camera 10 a confirmation message as confirmation of authentication of the camera.

When the authenticated relation between the camera 10 and the user client 16 has been established the checking means 54 is arranged to check if the operational user key $K_{OCU}$ has been set in the camera 10. This may e.g. be performed by checking if the indication means 52 has indicated that the operational user key $K_{OCU}$ has been set.

Further, if the result from the check performed by the checking means 54 is that the operational user key $K_{OCU}$ has been set in the camera 10 a message is sent to the user client indicating that the operational user key $K_{OCU}$ already has been set in the camera 10. The user may in such case reset the security settings of the camera 10 by deleting the operational user key $K_{OCU}$ set in the camera 10 and start over with the authentication process. Alternatively, the user may in such case reset the security settings of the camera 10 by deleting the operational user key $K_{OCU}$ set in the camera 10 and acquire a new operational user key $K_{OCU}$ to be generated and set in the camera 10, see above. The reset may be performed by means of the resetting means 60. The resetting means 60 is arranged to reset the set operational user key $K_{OCU}$. The resetting means 60 may comprise a reset button 62.

Alternatively, if the result from the check performed by the checking means 54 is that the operational user key $K_{OCU}$ has not been set in the camera 10 the operational user key $K_{OCU}$ is generated by the key generating means 50. Further, when the operational user key $K_{OCU}$ is generated it is set, by means of the key storing means 62, in the camera as well as indicated, by the indication means 52, that operational user key $K_{OCU}$ is set in the camera. Thus, the indication means 52 is arranged to indicate if the operational user key $K_{OCU}$ has been generated. The indicating means 52 may according to an embodiment be arranged to delete the initial user key $K_{ICU}$ from further usage if the operational user key $K_{OCU}$ has been generated. Alternatively may the indicating means 52 be arranged to set a flag indicating that the operational user key $K_{OCU}$ has been generated.

After being generated and set in the camera the operational user key $K_{OCU}$ is sent to the user client 16 and thus to the user. It is only the owner of the operational user key $K_{OCU}$ that will have full access rights to the camera 10 and to the media data produced by the camera 10.

The invention claimed is:

1. A method for restricting access to media data generated by a camera, comprising:
   setting a non-public initial user key, $K_{ICU}$, in the camera,
   providing a user client with the initial user key, $K_{ICU}$,
   establishing an authenticated relation between the user client and the camera by sending an authentication message including information based on the initial user key, $K_{ICU}$, from the user client to the camera,
   checking if an operational user key, $K_{OCU}$, is set in the camera, and
   performing, in response to the act of checking if the operational user key, $K_{OCU}$, is set in the camera, the acts a)-d) only if the operational user key, $K_{OCU}$, is not set:
   a) acquiring an operational user key, $K_{OCU}$,
   b) setting the operational user key, $K_{OCU}$, in the camera,
   c) setting the operational user key, $K_{OCU}$, in the user client, and
   d) indicating in the camera that the operational user key, $K_{OCU}$, is set,
   setting, in the camera, a media data encryption/decryption key associated with the operational user key, $K_{OCU}$,
   encrypting media data registered by the camera using the media data encryption key, and
   sending the encrypted media data to a service provider management server.

2. The method according to claim 1, further comprising the act of retrieving media data via the service provider management server by means of an arbitrary user client and decrypting the retrieved media data using the media encryption/decryption key.

3. The method according to claim 2, further comprising:
   acquiring a common key, $K_C$, to be shared between the camera, the user client and a service provider management server,
   setting the common key, $K_C$, in the camera,
   providing the common key, $K_C$, to the user client and to the service provider management server,
   encrypting meta data registered by the camera using a meta data encryption/decryption key associated with the common key, $K_C$, and
   sending the encrypted meta data to the service provider management server.

4. The method according to claim 1, further comprising:
   acquiring a common key, $K_C$, to be shared between the camera, the user client and a service provider management server,
   setting the common key, $K_C$, in the camera,
   providing the common key, $K_C$, to the user client and to the service provider management server,
   encrypting meta data registered by the camera using a meta data encryption/decryption key associated with the common key, $K_C$, and
   sending the encrypted meta data to the service provider management server.

5. The method according to claim 1, further comprising:
   acquiring a service provider key, $K_{SP}$, and
   providing the service provider key, $K_{SP}$, to the service provider management server, wherein the service provider key, $K_{SP}$, is used to guarantee that only the service provider management server can access service provider configuration functions.

6. The method according to claim 5, further comprising setting a master key, $K_M$, in the camera,
   said act of setting the non-public initial user key, $K_{ICU}$, in the camera comprises; acquiring the non-public initial user key, $K_{ICU}$, by deriving the non-public initial user key, $K_{ICU}$, from the master key, $K_M$, using a first one-way function, $f_1$, and said step of acquiring the service provider key, $K_{SP}$, comprises; deriving the service provider key, $K_{SP}$, from the master key, $K_M$, using a second one-way function, $f_2$.

7. The method according to claim 6, further comprising:

acquiring a common key, $K_C$, to be shared between the camera, the user client and a service provider management server, setting the common key, $K_C$, in the camera, providing the common key, $K_C$, to the user client and to the service provider management server, encrypting meta data registered by the camera using a meta data encryption/decryption key associated with the common key, $K_C$, and sending the encrypted meta data to the service provider management server;

wherein the step of acquiring the common key, $K_C$, comprises; deriving the common key, $K_C$, from the non-public initial user key, $K_{ICU}$, using a third one-way function, $f_3$, or deriving the common key, $K_C$, from the service provider key, $K_{SP}$, using a fourth one-way function, $f_4$, wherein the third one-way function, $f_3$, and the fourth one-way function, $f_4$, are arranged to produce an identical common key, $K_C$, independent of if the common key, $K_C$, is derived from the non-public initial user key, $K_{ICU}$, or from the service provider key, $K_{SP}$.

8. The method according to claim 1, further comprising indicating that the operational user key, $K_{OCU}$, is already set if the operational user key, $K_{OCU}$, is set.

9. The method according to claim 8, wherein the act of indicating in the camera that the operational user key, $K_{OCU}$, is set comprises deleting the initial user key, $K_{ICU}$, from further usage.

10. The method according to claim 1, wherein the act of indicating in the camera that the operational user key, $K_{OCU}$, is set comprises deleting the initial user key, $K_{ICU}$, from further usage.

11. The method according to claim 1, further comprising:

setting a master key, $K_M$, in the camera, and wherein the act of setting the non-public initial user key, $K_{ICU}$, in the camera comprises; acquiring the non-public initial user key, $K_{ICU}$, by deriving the non-public initial user key, $K_{ICU}$, from the master key, $K_M$, using a first one-way function, $f_1$.

12. The method according to claim 1, wherein the act of establishing the authenticated relation between the user client and the camera further comprises authenticating the camera by sending a video sequences from the camera to the user client for verification of that the video sequence is captured in real time by the intended camera, and sending from the user client to the camera a confirmation message as confirmation of authentication of the camera, after authenticating the user client by sending an authentication message including information based on the initial user key, $K_{ICU}$, from the user client to the camera is performed.

13. A network camera arranged to encode media data registered by the camera, said network camera comprising:

a processor that is configured to:

generate a non-public initial user key, KICU, in the camera which is used to establish an authenticated relation between the user client and the camera, check if an operational user key, KOCU, is set in the camera, perform, in response to the act of checking if the operational user key, KOCU, is set in the camera, the acts a)-c) only if the operational user key KOCU is not set:

a) generate an operational user key, KOCU, b) set the operation user key, KOCU, in the camera, c) indicate in the camera that the operational user key, KOCU, is set, encrypt media data registered by the camera using a media data encryption key associated with the operational user key, KOCU, transmit the encrypted media data.

14. The network camera according to claim 13, wherein the processor is further configured to generate a common key, Kc, encrypt meta data registered by the camera using a meta data encryption/decryption key associated with the common key, Kc, and transmit the encrypted meta data.

15. The network camera according to claim 13, wherein the processor is further configured to reset the generated operational user key, KOCU.

16. The network camera according to claim 15, wherein the processor resets the generated operational user key, KOCU, by a means of a reset button.

17. The network camera according to claim 13, wherein the processor is further configured to delete the initial user key, KICU, from further usage, if the operational user key, KOCU, has been generated.

* * * * *